(12) United States Patent
Siddiqui

(10) Patent No.: US 11,584,311 B2
(45) Date of Patent: Feb. 21, 2023

(54) INTERIOR TRIM PANEL FOR A VEHICLE INTERIOR

(71) Applicant: FAURECIA INDIA PRIVATE LIMITED, Pune (IN)

(72) Inventor: Firoz Siddiqui, Pune (IN)

(73) Assignee: FAURECIA INDIA PRIVATE LIMITED, Pune (IN)

( * ) Notice: Subject to any disclaimer, the term of this patent is extended or adjusted under 35 U.S.C. 154(b) by 160 days.

(21) Appl. No.: 16/953,204

(22) Filed: Nov. 19, 2020

(65) Prior Publication Data

US 2021/0146859 A1 May 20, 2021

(30) Foreign Application Priority Data

Nov. 19, 2019 (IN) .............................. 201921047108

(51) Int. Cl.
*B60R 13/02* (2006.01)
*B60H 1/00* (2006.01)
*B60H 1/34* (2006.01)

(52) U.S. Cl.
CPC ....... *B60R 13/0256* (2013.01); *B60H 1/0065* (2013.01); *B60H 1/3435* (2013.01); *B60R 13/0243* (2013.01)

(58) Field of Classification Search
CPC ............ B60R 13/0256; B60R 13/0243; B60H 1/3435; B60H 1/0065
See application file for complete search history.

(56) References Cited

FOREIGN PATENT DOCUMENTS

JP 2013154852 A * 8/2013

* cited by examiner

*Primary Examiner* — D Glenn Dayoan
*Assistant Examiner* — Melissa Ann Bonifazi
(74) *Attorney, Agent, or Firm* — Reising Ethington P.C.

(57) ABSTRACT

An interior trim panel for a vehicle interior. The panel includes an air distributing member for distributing the air, a first air distribution channel for distributing the airflow from the air distributing member into the vehicle interior. A canopy is configured to partly cover an accessory arranged on the interior trim panel. Further, the interior trim panel includes a second air distribution channel configured in a gap formed between the canopy and the accessory for distributing the airflow from the air distributing member. Further, the air distributing from the second distribution channel is deviated towards the vehicle interior by a curved extension of the canopy.

20 Claims, 10 Drawing Sheets

INTERIOR TRIM PANEL FOR A VEHICLE INTERIOR

FIELD OF THE INVENTION

The present invention relates to an interior trim panel. More specifically, the present invention relates to an interior trim panel of a vehicle interior.

BACKGROUND

Generally, interior trim panel such as instrument panel or door panel or central console with air distributing members (air vents) is provided in a vehicle interior for circulating air to the vehicle interior of a vehicle. These air distributing members are connected to an HVAC (heating, ventilation, and air conditioning) unit through ducts arranged inside the vehicle. These interior trim panels may also provide with accessories such as a display, a music system or a speedometer or a glove box or such accessories, which provide a specific provision to passengers of the vehicle.

In existing vehicles, the air distributing channels are generally provided at the lower side of the accessories (display). When air is discharging from the air distributing members arranged on the interior trim panel, the air is directed towards the middle or lower portion of a backrest of the seat. So, the passenger resting on the seat could not be able to get air at his/her upper portion. Therefore, to provide airflow at a different position, separate air distributing channels needs to be configured in the interior trim panel. These air distributing channels consumes more space in the vehicle interiors. Also, user comfort with existing air distributing channels is less.

Some of the existing vehicles feature multiple air distributing channels arranged in multiple positions inside the vehicle interiors. But, the construction of these air distributing members, ducts connecting these channels to the HVAC unit of the vehicle is complex. Also, the user cannot be able to choose airflow from multiple channels selectively.

Furthermore, the existing air distributing channels includes tabs. These tabs accumulate dust. These tabs also configured as grids. These grids are complex in structure.

Therefore, there is a need for an interior trim panel, which overcomes few or all of the drawbacks of the existing air distributing systems.

SUMMARY

An object of the present invention is to provide an interior trim panel for a vehicle interior.

Another object of the present invention is to an interior trim panel for a vehicle interior for providing enhanced comfort to passengers of the vehicle.

Yet another object of the present invention is to provide an interior trim panel for a vehicle interior for providing air distributing channels at multiple locations of the vehicle interior.

Still another object of the present invention is to provide an interior trim panel for a vehicle interior, which consumes less space in the vehicle interior.

Further, an object of the present invention is to provide an interior trim panel for a vehicle interior, which is simple in construction and easy in operation.

According to at least some embodiments of the present invention, there is provided with an interior trim panel for a vehicle interior. The interior trim panel can be an instrument panel or a door panel or a central console trim panel.

The interior trim panel may include an air distributing member for distributing the air into the vehicle interior, a first air distribution channel for distributing the airflow from the air distributing member into the vehicle interior and a canopy configured to partly cover an accessory arranged on/in the interior trim panel.

Further, the interior trim panel may include a second air distribution channel configured in a gap formed between the canopy and the accessory for distributing the airflow from the air distributing member into the vehicle interior. The air distributing from the second distribution channel may be deviated towards the vehicle interior by a curved extension of the canopy. The accessory may be a display unit or an HMI (human-machine interface) or an indication panel.

In an embodiment, air distributing member may include one or more inlet and one or more outlet. The air distributing member may be connected to a duct of an HVAC unit of the vehicle for receiving air. The inlet receives air from the HVAC unit. The outlet discharges the received air from the HVAC unit towards the first distribution channel and/or the second distribution channel.

Further, the air distributing member may be rotatable between a first position and a second position. In an embodiment, the air distributing member may have an operating knob or an electronic prime mover for rotating the air distributing member between a first position and a second position. Furthermore, when the air distributing member is in the first position, the air from the outlet may be distributed into the vehicle interior through the first air distribution channel.

Similarly, when the distributing member is at the second position, the air from the outlet may be distributed into the vehicle interior through the second air distribution channel. Similarly, when the air distributing member is positioned at a first intermediate position between the first position and the second position, the air from the outlet may be distributed into the vehicle interior through both the first distribution channel and the second distribution channel. Similarly, when the air distributing member is at a second intermediate position, the air from the outlet may shut off for both the first distribution channel and the second distribution channel.

In an alternative embodiment, the interior trim panel may include a static inner member and an air distributing member. The static inner member may be having one or more inlet. The inlet may be connected to a duct of an HVAC unit of the vehicle. Further, the static inner member may include two or more outlets. The air coming from the duct may be distributed through the outlets. The air distributing member may be rotatable around the static inner member between a first operating position and a second operating position. The air distributing member and the static inner member may be coaxially connected. Further, an inner surface of the air distributing member may move on an outer surface of the static inner member. The air distributing member may be having two or more openings.

Further, when the air distributing member is at first operating position, the air from the outlet may pass through the opening of the air distributing member to the first air distribution channel. Similarly, when the air distributing member is at the second operating position, the air from the outlet may pass through the opening of the air distributing member to the second air distribution channel. Similarly, when the air distributing member is at an intermediate operating position, the air from the outlets may pass through the openings of the air distributing member to the first air distribution channel and the second air distribution channel.

BRIEF DESCRIPTION OF THE DRAWINGS

The advantages and features of the present invention will be understood better with reference to the following detailed description of some embodiments and claims taken in conjunction with the accompanying drawings, wherein like elements are identified with like symbols, and in which:

DETAILED DESCRIPTION

An embodiment of this invention will now be described in detail. The words "comprising, "having, "containing," and "including," and other forms thereof, are intended to be equivalent in meaning and be open-ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "an" and "a" herein do not denote a limitation of quantity, but rather denote the presence of at least one of the referenced item.

The disclosed embodiments are merely exemplary of the invention, which may be embodied in various forms.

Figure 2:
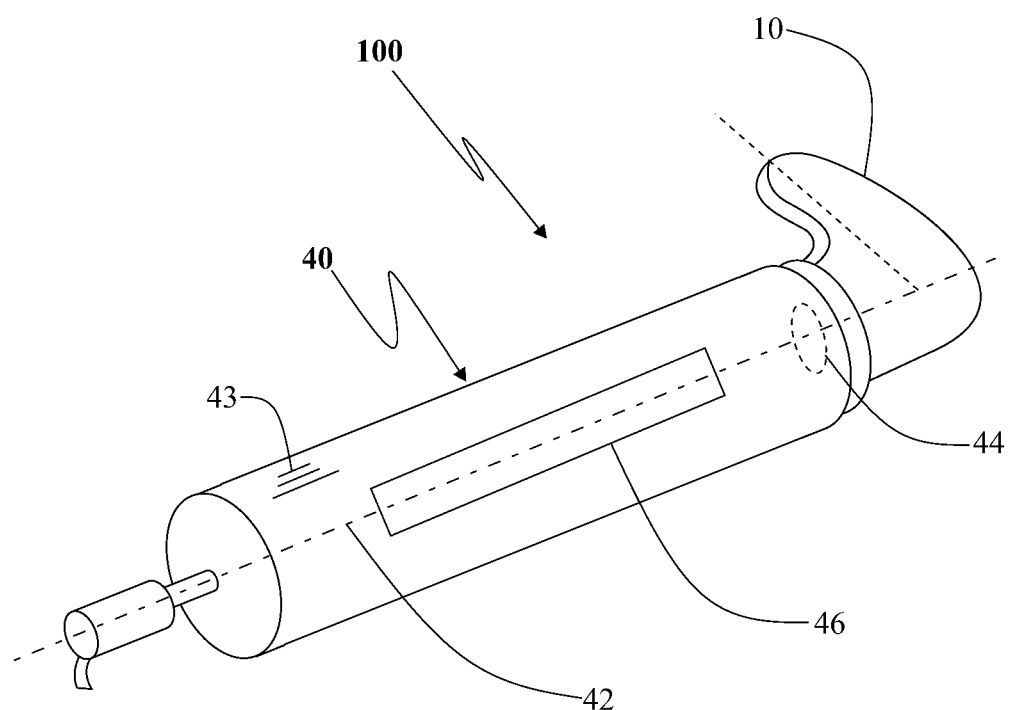
FIG. 2 shows a perspective view of the air distributing member shown in FIGS. 1A, 1B, and 1C.
Figure 3:
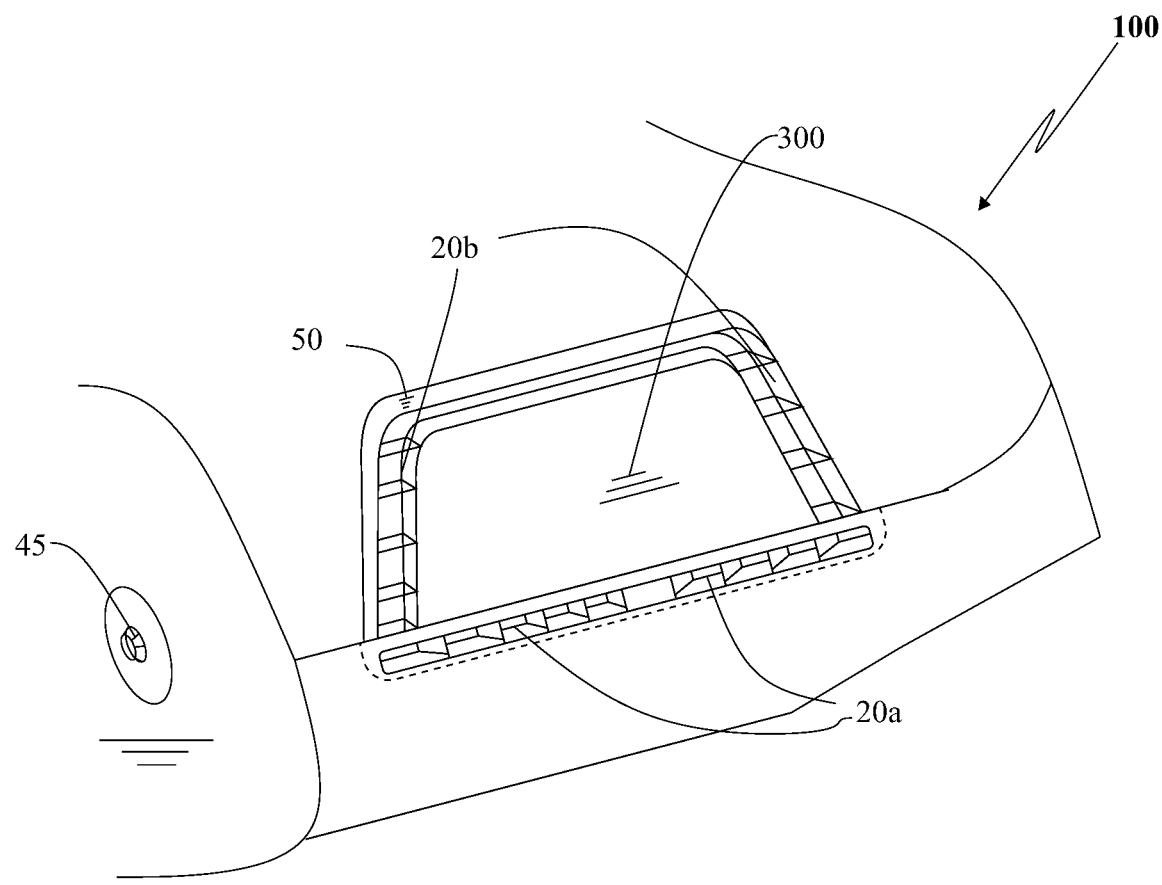
FIG. 3 shows a perspective view of the interior trim panel shown in figures FIGS. 1A, 1B, and 1C.

Referring now to FIGS. 1A, 1B, 1C, 3, and 4, various views of an interior trim panel in the form of the instrument panel 100 for a vehicle interior 500 in accordance with an embodiment of the present invention are illustrated. The interior trim panel 100 can be an instrument panel or a door panel or a central console trim panel. The interior trim panel 100 includes a duct 10 (refer FIG. 2) for circulating air from an HVAC unit (not numbered) of the vehicle to a vehicle interior. The duct 10 extends from the HVAC unit towards a cavity 210 configured in the interior trim panel 100 of the vehicle. The duct 10 can be a cylindrical pipe. The interior trim panel 100 includes an air distributing member 40, a first air distribution channel 20a and a canopy 50. The air distributing member 40 is distributing the air. The first air distribution channel 20a distributes the airflow from the air distributing member 40 into the vehicle interior. The canopy 50 is configured to partly cover an accessory 300 arranged on the interior trim panel 100. In this embodiment, the canopy 50 is an extended part of the interior trim panel 100. In an alternative embodiment, the canopy 50 can be a metallic/plastic bezel of the accessory 300. The accessory 300 is a display unit or an HMI (human-machine interface) or an indication panel.

Further, the interior trim panel includes a second air distribution channel 20b. The second air distribution channel 20b is configured in a gap 30 formed between the canopy 50 and the accessory 300 for distributing the airflow from the air distributing member 40 into the vehicle interior. Furthermore, the air distributing from the second distribution channel 20b is deviated towards the vehicle interior by a curved extension 52 of the canopy 50.

In an embodiment, the air distributing member 40 is arranged between the duct 10 and air distribution channels 20a and 20b. More specially, the air distributing member 40 is pivotally arranged between the duct 10 and the air distribution channels 20a and 20b. In the present embodiment, the air distributing member 40 is cylindrical in shape (refer FIG. 2). It may be obvious to a person skilled in the art to configure the air distributing member 40 in any other obvious shapes.

The air distributing member 40 is arranged in the cavity 210 configured in the interior trim panel 100. The air distributing member 40 is pivotally connected to the interior trim panel 100. The air distributing member 40 is arranged in such a way that, the air distributing member 40 is rotatable around the pivotal axis 42 of the air distributing member 40.

Furthermore, the air distributing member 40 includes one or more inlet 44 and one or more outlets 46. The air distributing member 40 is connected to the duct 10 of an HVAC unit of the vehicle for receiving air. The inlet 44 receives air from the HVAC unit. The air from the duct 10 axially enters into the air distributing member 40. An outer surface 43 of the air distributing member 40 slides on an inner surface 212 of the cavity 210 of the interior trim panel 100. The outlet 46 is discharging the received air from the HVAC unit towards the first distribution channel 20a and/or the second distribution channel 20b.

Further, the air distributing member 40 is rotatable between a first position 40a and a second position 40b. In an embodiment, the air distributing member 40 is having an operating knob 45 (refer FIGS. 3 and 4) or an electronic prime mover for rotating the air distributing member 40 between the first position 40a and the second position 40b.

Furthermore, when the air distributing member 40 is at the first position 40a, the air from the duct 10 is directed into the vehicle interior through the first air distribution channel 20a. More specifically, when the air distributing member 40 is at the first position 40a, the outlet 46 is coaxial with a first passage 22a configured in the interior trim panel 100. The first air distribution channel 20a is arranged at a discharging end of the first passage 22a of the interior trim panel 100. Therefore, the air from the outlet 46 is distributed into the vehicle interior through the first air distribution channel 20a.

Similarly, when the air distributing member 40 is at the second position 40b, the air from the duct 10 is directed into the vehicle interior through the second air distribution channel 20b. More specifically, when the air distributing member 40 is at the second position 40b, the outlet 46 is coaxial with a second passage 22b configured in the interior trim panel 100. The second air distribution channel 20b is arranged at a discharging end of the second passage 22b. Therefore, the air from the outlet 46 is distributed into the vehicle interior through the second air distribution channel 20b.

Similarly, when the air distributing member 40 is positioned at a first intermediate position 40c (FIG. 1C) between the first position 40a and the second position 40b, the air from the outlet 46 is distributed into the vehicle interior through both the first distribution channel 20a and the second distribution channel 20b. The interior trim panel 100 includes a stopping member 70 for preventing further movements of the air distributing member 40 beyond the first position 40a and the second intermediate position 41 and also to avoid leakage of air from the cavity 210.

The stopping member 70 enables the flow of air from the air distributing member 40 to either the first air distribution channel 20a or to the second air distribution channel 20b or both. It may be obvious to a person skilled in the art to configure the interior trim panel 100 to increase or decrease the number of air distribution channels for providing air circulation at multiple locations of the vehicle interior 500. Similarly, it may be obvious to a person skilled in the art to configure the interior trim panel 100 with more than 3 positions (40a, 40b, and 40c) of the air distributing member 40 for distributing air through the air distribution channels.

Figure 1A:
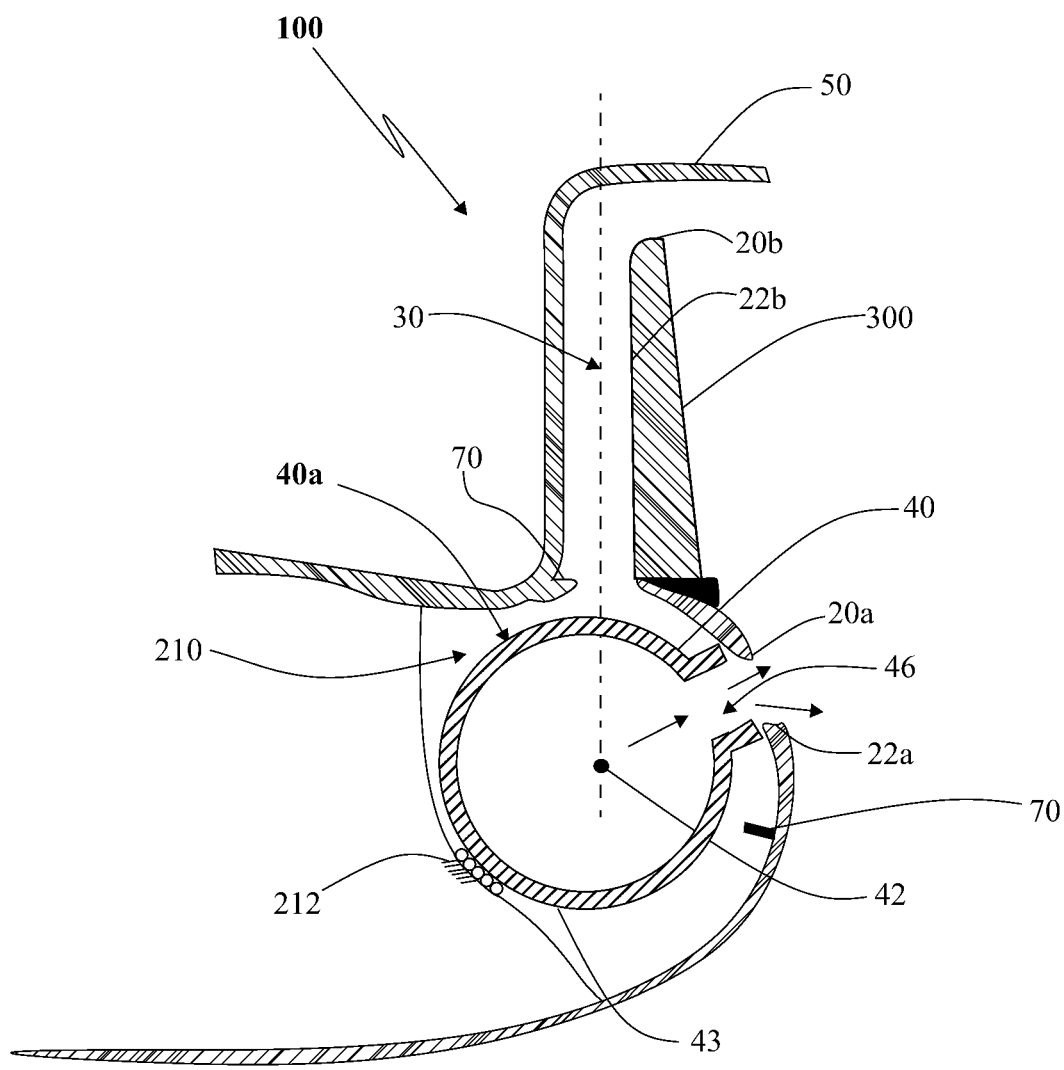
FIG. 1A illustrates a sectional view of an interior trim panel for a vehicle interior with an air distributing member at a first position in accordance with an embodiment of the present invention.
Figure 1B:
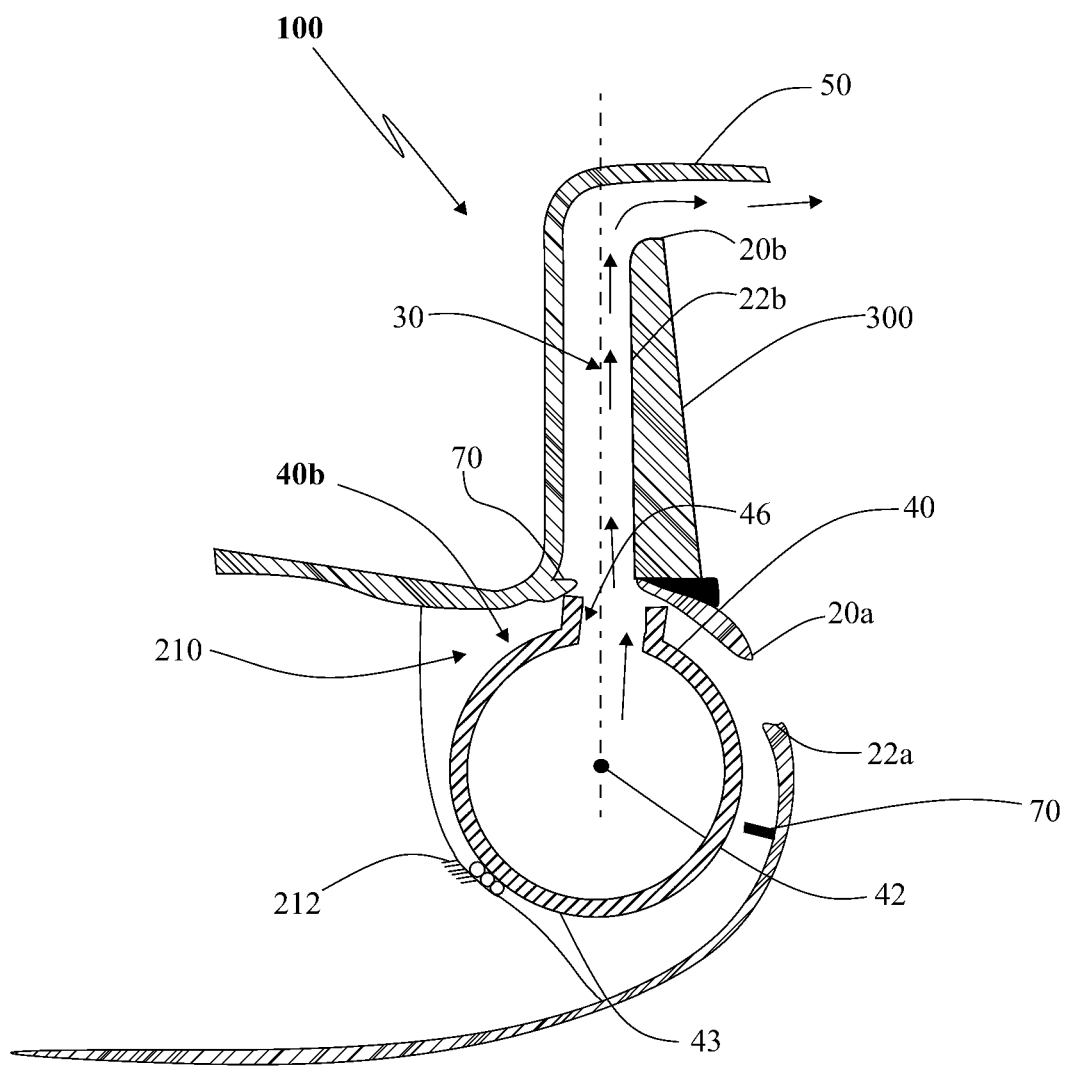
FIG. 1B shows a sectional view of the interior trim panel with the air distributing member at a second position.
Figure 1C:
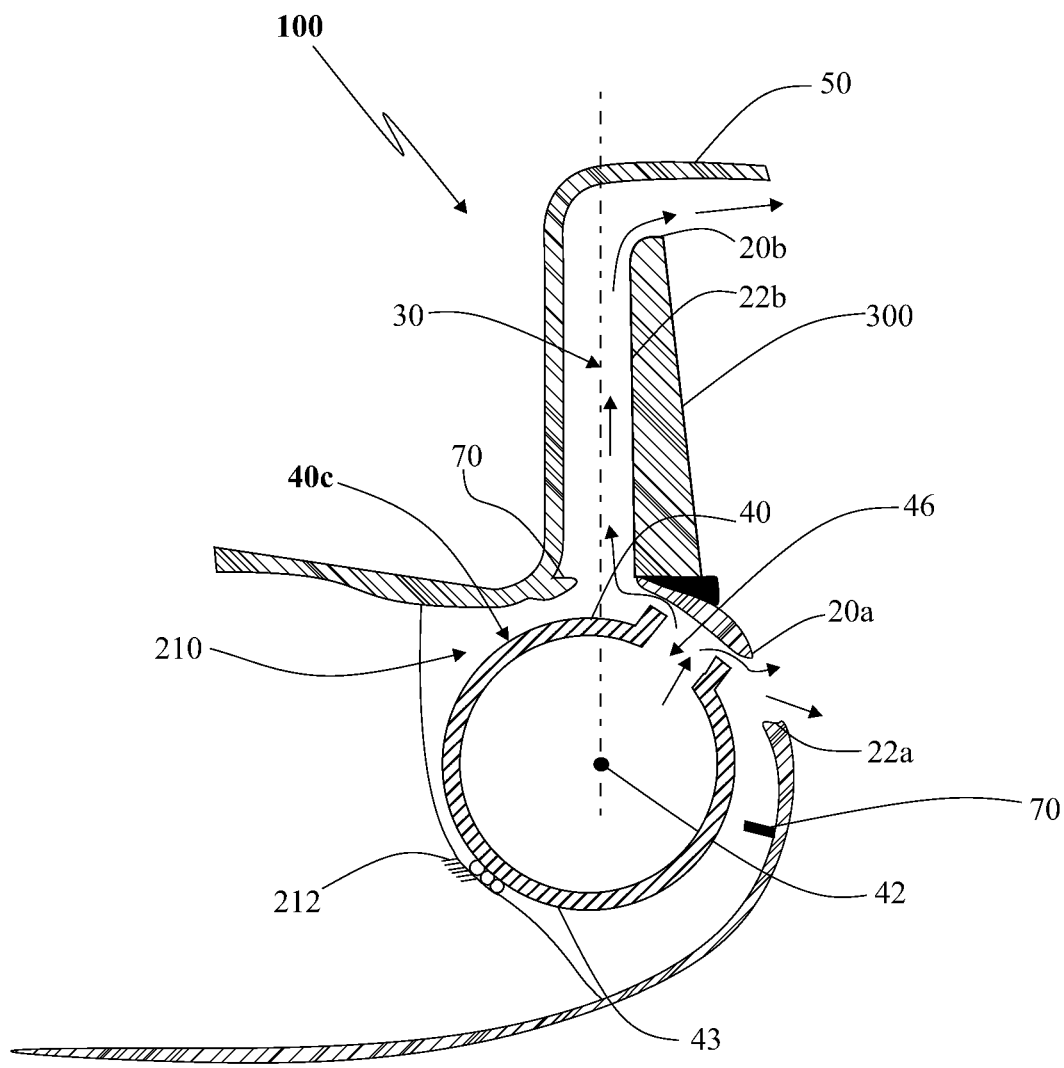
FIG. 1C shows a sectional view of the interior trim panel with the air distributing member at a first intermediate position.
Figure 1D:
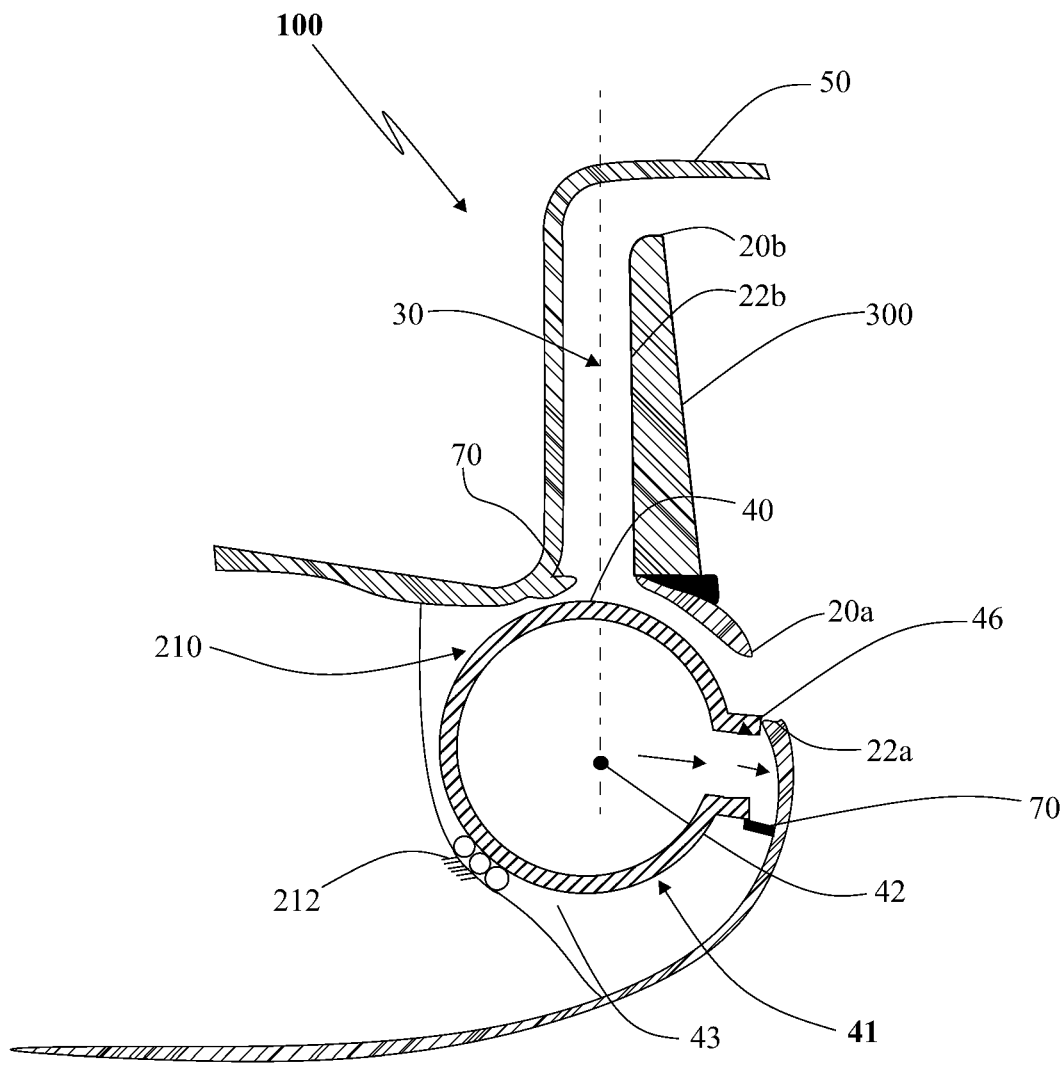
FIG. 1D shows a sectional view of the interior trim panel with the air distributing member at a second intermediate position.

Referring now to FIG. 1D, a sectional view of the interior trim panel 100 with the air distributing member 40 at the second intermediate position 41. When the air distributing member 40 is at the second intermediate position 41, the air from the outlet 46 is shut off for both the first distribution channel 20a and the second distribution channel 20b. It may be obvious to person skilled in the art to configure the geometric dimensions and shapes of the interior trim panel 100 and the air distributing member 40 for achieving shut off of the both the first distribution channel 20a and the second distribution channel 20b, when the air distributing member 40 is at the second intermediate position 41.

Figure 4:
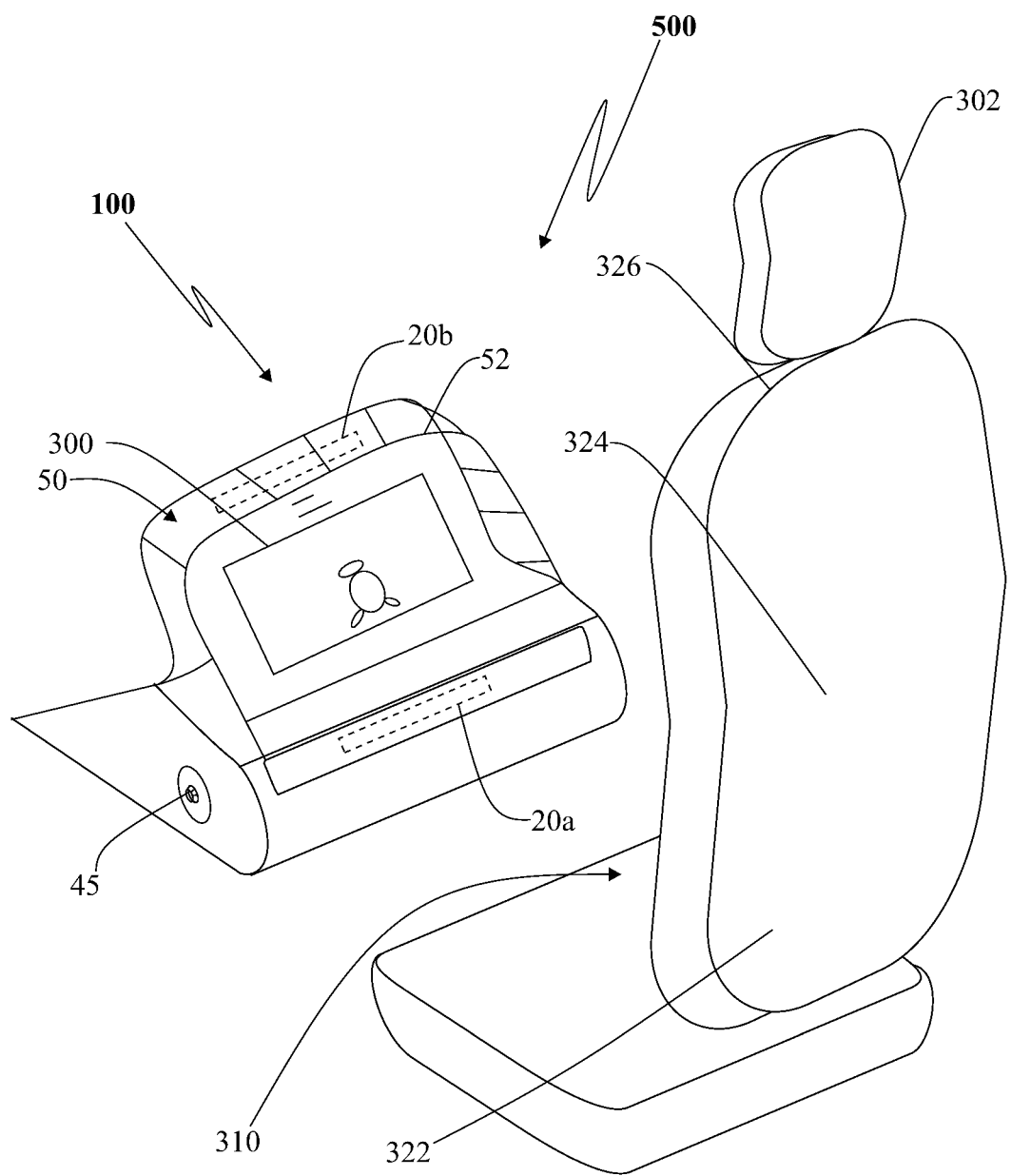
FIG. 4 shows a perspective view of a vehicle interior with the interior trim panel of FIG. 3.
Figure 5A:
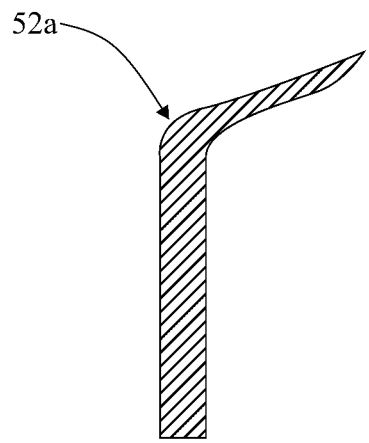
FIG. 5A, 5B, 5C shows sectional views of a curved extension a canopy configured around an accessory arranged on the interior trim panel shown in FIG. 4.
Figure 5B:
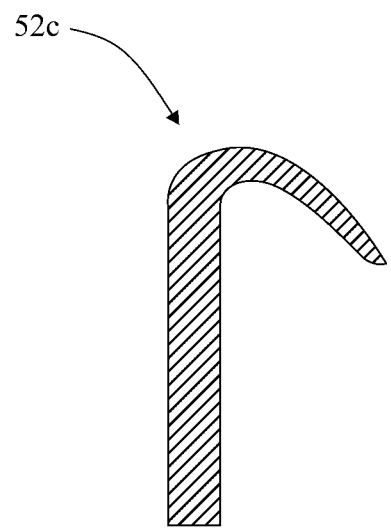
Figure 5C:
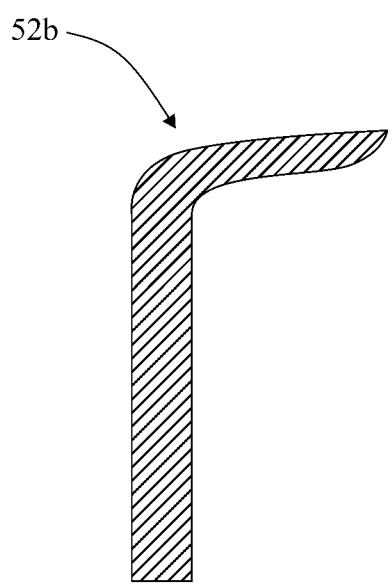

Referring now to FIG. 4, a perspective view of a vehicle interior 500 with the interior trim panel 100 is illustrated. The air discharging from the second air distribution channel 20b is deviated towards the vehicle interior 50 by the curved extension 52 like the canopy 50. The curved extension 52 is configured to direct airflow from the second air distribution channel 20b towards a headrest 302 of a seat 310 from a front side of the seat 310. Similarly, the curved extension 52 can be configured with various shapes (as shown in FIGS. 5A, 5B, 5C) in order to deviate the airflow to pre-defined destinations. The predefined destinations can be towards a base 322 or a middle portion 324 or an upper portions 326 of a backrest 320 or a headrest or such interior components of the vehicle interior. For example, the curved extension 52 can be configured with deviations 52a, 52b and 52c for deviating air upwards, downwards and straight respectively.

Figure 6A:
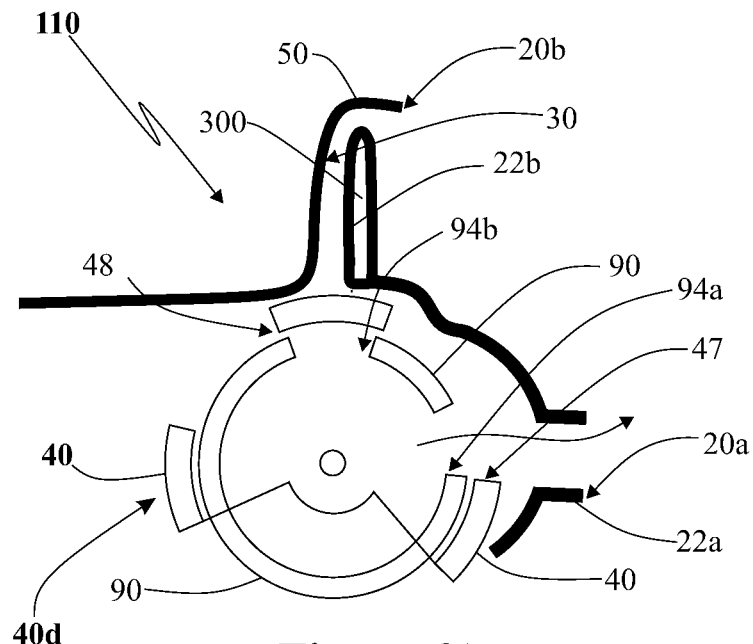
FIGS. 6A, 6B and 6C show perspective views of an alternative embodiment of an instrument panel for a vehicle interior with an air distributing member at a first operating position, a second operating position and an intermediate operating position.
Figure 6B:
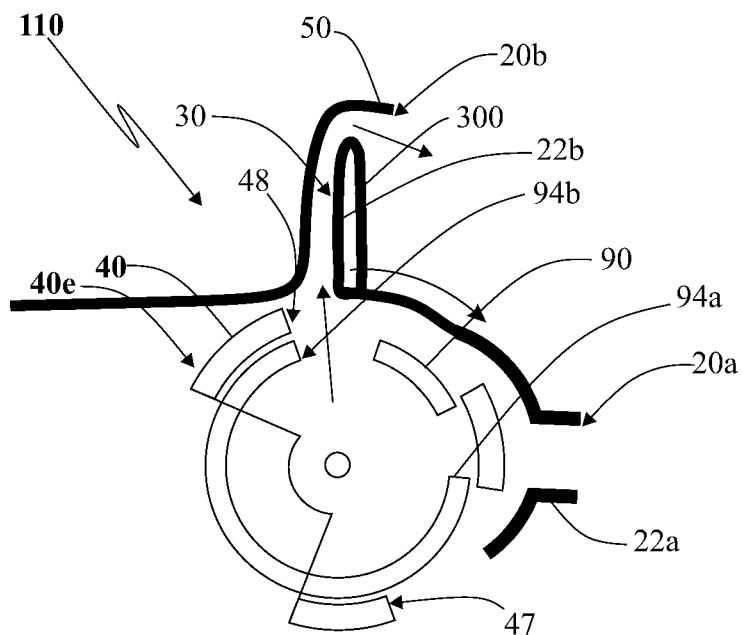
Figure 6C:
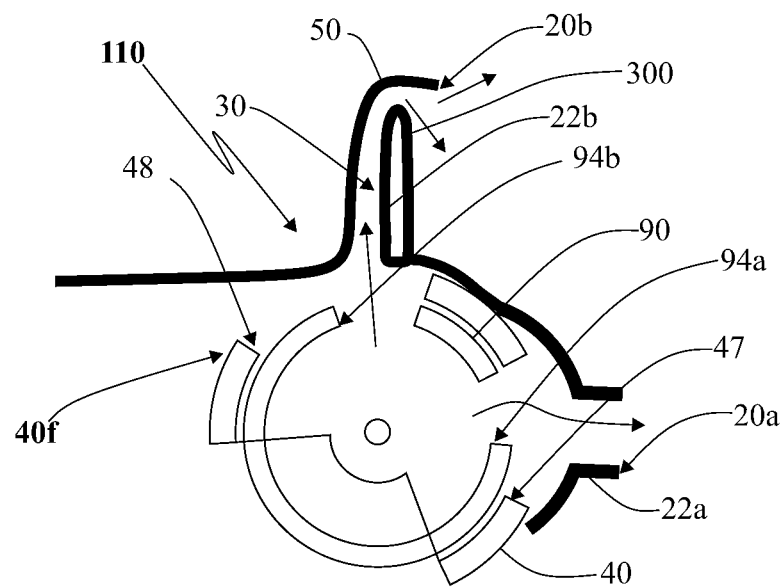
Figure 7:
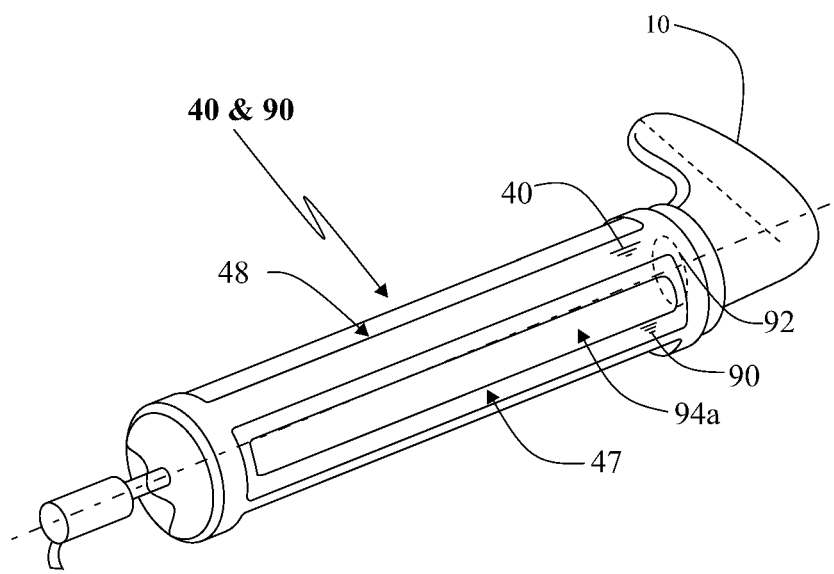
FIG. 7 shows a perspective view of the air distributing member arranged with a static inner member of the instrument panel shown in FIGS. 6A, 6B, and 6C.

Referring now to FIGS. 6A, 6B and 6C, various views of an alternative embodiment of an interior trim panel 110 for the vehicle interior 500 are illustrated. In this embodiment, the air distributing member 40 (refer FIG. 7) of the interior trim panel 110 includes a static inner member 90 and an air distributing member 40. The static inner member 90 is a hollow cylinder with an inner surface and an outer surface. The static inner member 90 is having one or more inlet 92. The inlet 92 receives air from the duct 10. Further, the static inner member 90 includes two outlets 94a and 94b or more.

The air coming from the duct 10 is received at the inlet 92 and discharges through the outlets 94a and 94b.

The air distributing member 40 is rotatable around the static inner member 90 between a first operating position 40d and a second operating position 40e. The air distributing member 40 is rotated by operating the operating knob 45 or an electronic prime mover accessible to a user. The air distributing member 40 is also a hollow cylinder. An inner diameter of the air distributing member 40 is more than an outer diameter of the static inner member 90. The air distributing member 40 and the static inner member 90 is coaxially connected. Further, an inner surface of the air distributing member 40 moves on an outer surface of the static inner member 90. The air distributing member 40 is having two openings 47 and 48 or more.

Further, when the air distributing member 40 is at first operating position 40d, the air from the outlets 94a passes through the opening 47 to the first air distribution channel 20a. Similarly, when the air distributing member 40 is at the second operating position 40e, the air from the outlets 94b passes through the opening 48 to the second air distribution channel 20b. Similarly, when the air distributing member 40 is at an intermediate operating position 40f, the air from outlets 94a and 94b passes through the openings 47 and 48 respectively to the first air distribution channel 20a and the second air distribution channel 20b.

Therefore, this arrangement has the advantage of providing the interior trim panel 100 and 110 for the vehicle interior. The interior trim panel 100 provides air distribution channels at multiple locations of the vehicle interior. Further, the interior trim panel 100 and 110 enhances the comfort of passengers of the vehicle. Furthermore, the interior trim panel 100 and 110 consumes less space in the vehicle interior for distributing air to multiple locations. Also, the interior trim panel 100 is simple in construction and easy in operation.

The foregoing descriptions of specific embodiments of the present invention have been presented for purposes of illustration and description. They are not intended to be exhaustive or to limit the present invention to the precise forms disclosed, and obviously, many modifications and variations are possible in light of the above teaching. The embodiments were chosen and described in order to best explain the principles of the present invention and its practical application, and to thereby enable others skilled in the art to best utilise the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

The invention claimed is:

1. An interior trim panel for a vehicle interior of a vehicle, comprising:
    a first air distribution channel for distributing air into the vehicle interior;
    a canopy configured to partly cover an accessory arranged on or in the interior trim panel;
    a second air distribution channel for distributing air into the vehicle interior and configured in a gap formed between the canopy and the accessory; and
    a duct for circulating air from an HVAC unit of the vehicle to the vehicle interior;
    wherein an air distributing member is pivotally arranged between the duct and the air distribution channels such that the air distributing member is rotatable around a pivotal axis between a first position and a second position; and wherein the air distributing member includes:
   at least one inlet for receiving air from the HVAC unit; and
   at least one outlet for selectively discharging the received air from the HVAC unit towards the first air distribution channel or the second air distribution channel.

2. The interior trim panel as claimed in claim 1, wherein the air distributing from the second air distribution channel is deviated towards the vehicle interior by a curved extension of the canopy.

3. The interior trim panel as claimed in claim 1, wherein the accessory is a display unit or an HMI (human-machine interface) or an indication panel.

4. The interior trim panel as claimed in claim 1, further comprising an operating knob or an electronic prime mover for rotating the air distributing member between the first position and the second position.

5. The interior trim panel as claimed in claim 1, wherein when the air distributing member is in the first position, the air from the outlet is distributed into the vehicle interior through the first air distribution channel, when the air distributing member is in the second position, the air from the outlet is distributed into the vehicle interior through the second air distribution channel, when the air distributing member is positioned at a first intermediate position between the first position and the second position, the air from the outlet is distributed into the vehicle interior through both the first distribution channel and the second distribution channel, and when the air distributing member is positioned at a second intermediate position, the air from the outlet is shut off for both the first distribution channel and the second distribution channel.

6. The interior trim panel as claimed in claim 1, wherein the interior trim panel is an instrument panel or a door panel.

7. The interior trim panel as claimed in claim 1, wherein the interior trim panel comprises:
   a static inner member connected to the duct;
   wherein the air distributing member is rotatable around the static inner member between the first position and the second position to selectively discharge received air received by the static inner member towards the first distribution channel or the second distribution channel, the air distributing member and the static inner member being coaxially connected such that an inner surface of the air distributing member moves on an outer surface of the static inner member.

8. The interior trim panel as claimed in claim 7, wherein the air distributing member has an intermediate position at which air passes from the static inner member to the first air distribution channel and the second air distribution channel.

9. An interior trim panel for a vehicle interior of a vehicle, comprising:
   an air distributing member;
   a first air distribution channel for distributing air from the air distributing member into the vehicle interior;
   a canopy configured to partly cover an accessory arranged on or in the interior trim panel; and
   a second air distribution channel for distributing air from the air distributing member into the vehicle interior and configured in a gap formed between the canopy and the accessory;
   wherein the air distributing from the second air distribution channel is deviated towards the vehicle interior by a curved extension of the canopy.

10. The interior trim panel as claimed in claim 9, wherein the accessory is a display unit or an HMI (human-machine interface) or an indication panel.

11. The interior trim panel as claimed in claim 9, further comprising an operating knob or an electronic prime mover for rotating the air distributing member between a first position and a second position.

12. The interior trim panel as claimed in claim 9, wherein the air distributing member includes at least one outlet, and wherein: when the air distributing member is in a first position, air from the outlet is distributed into the vehicle interior through the first air distribution channel, when the air distributing member is in a second position, air from the outlet is distributed into the vehicle interior through the second air distribution channel, when the air distributing member is positioned at a first intermediate position between the first position and the second position, air from the outlet is distributed into the vehicle interior through both the first distribution channel and the second distribution channel, and when the air distributing member is positioned at a second intermediate position, air from the outlet is shut off for both the first distribution channel and the second distribution channel.

13. The interior trim panel as claimed in claim 9, wherein the interior trim panel is an instrument panel or a door panel.

14. The interior trim panel as claimed in claim 9, wherein the interior trim panel comprises:
   a static inner member with at least one inlet and at least two outlets, the inlet being connected to a duct of an HVAC unit of the vehicle, and air from the duct being distributed through the outlets;
   wherein the air distributing member is rotatable around the static inner member between a first operating position and a second operating position, the air distributing member and the static inner member being coaxially connected such that an inner surface of the air distributing member moves on an outer surface of the static inner member, the air distributing member having at least two openings,
   wherein, when the air distributing member is at the first operating position, air from one of the outlets passes through one of the openings to the first air distribution channel, when the air distributing member is at the second operating position, air from one of the outlets passes through one of the openings to the second air distribution channel, and when the air distributing member is at an intermediate operating position, air from the outlets passes through the openings to the first air distribution channel and the second air distribution channel.

15. An interior trim panel for a vehicle interior of a vehicle, comprising:
   an air distributing member;
   a first air distribution channel for distributing air from the air distributing member into the vehicle interior;
   a canopy configured to partly cover an accessory arranged on or in the interior trim panel; and
   a second air distribution channel for distributing air from the air distributing member into the vehicle interior and configured in a gap formed between the canopy and the accessory,
   wherein the air distributing member is connected to a duct of an HVAC unit of the vehicle for receiving air, wherein the air distributing member includes:
- at least one inlet for receiving air from the HVAC unit; and
- at least one outlet for discharging the received air from the HVAC unit towards the first distribution channel and/or the second distribution channel, and wherein the air distributing member includes an operating knob or an electronic prime mover for rotating the air distributing member between a first position and a second position.

16. The interior trim panel as claimed in claim 15, wherein, when the air distributing member is in the first position, air from the air distributing member is distributed into the vehicle interior through the first air distribution channel.

17. The interior trim panel as claimed in claim 15, wherein, when the air distributing member is in the second position, air from the air distributing member is distributed into the vehicle interior through the second air distribution channel.

18. The interior trim panel as claimed in claim 15, wherein, when the air distributing member is positioned at an intermediate position between the first position and the second position, air from the air distributing member is distributed into the vehicle interior through both the first distribution channel and the second distribution channel.

19. The interior trim panel as claimed in claim 15, wherein, when the air distributing member is positioned at an intermediate position between the first position and the second position, air from the air distributing member is shut off for both the first distribution channel and the second distribution channel.

20. The interior trim panel as claimed in claim 15, wherein the interior trim panel is an instrument panel or a door panel.

* * * * *